US011029416B2

United States Patent
Hawari et al.

(10) Patent No.: US 11,029,416 B2
(45) Date of Patent: Jun. 8, 2021

(54) HOLISTIC DIGITAL GAMMA-RAY SPECTROSCOPY METHODS AND INSTRUMENTATION FOR HIGH-THROUGHPUT HIGH-RESOLUTION APPLICATIONS

(71) Applicant: North Carolina State University, Raleigh, NC (US)

(72) Inventors: Ayman I. Hawari, Raleigh, NC (US); Shefali Saxena, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 0 days.

(21) Appl. No.: 16/794,282

(22) Filed: Feb. 19, 2020

(65) Prior Publication Data
US 2020/0355836 A1    Nov. 12, 2020

Related U.S. Application Data

(60) Provisional application No. 62/821,658, filed on Mar. 21, 2019.

(51) Int. Cl.
*G01T 1/15*    (2006.01)
*G01T 1/40*    (2006.01)
*G01T 1/36*    (2006.01)

(52) U.S. Cl.
CPC .............. *G01T 1/15* (2013.01); *G01T 1/367* (2013.01); *G01T 1/40* (2013.01)

(58) Field of Classification Search
CPC ........... G01T 1/366; G01T 1/40; G01T 1/171; G01T 1/17; G01T 1/15; G01T 1/367
See application file for complete search history.

(56) References Cited

U.S. PATENT DOCUMENTS

| | | | | |
|---|---|---|---|---|
| 5,684,850 | A * | 11/1997 | Warburton | G01T 1/171 378/53 |
| 5,873,054 | A * | 2/1999 | Warburton | G01T 1/171 702/190 |
| 7,763,859 | B2 * | 7/2010 | Mott | G01T 1/171 250/369 |

OTHER PUBLICATIONS

Saxena, Shefali, et al., "Digital pulse deconvolution with adaptive shaping for real-time high-resolution high-throughput gamma spectroscopy", Elsevier, Nuclear Inst. and Methods in Physics Research, A, vol. 954, article id. 161288, 5 pages.

* cited by examiner

*Primary Examiner* — David P Porta
*Assistant Examiner* — Fani Boosalis
(74) *Attorney, Agent, or Firm* — NK Patent Law

(57) ABSTRACT

Method of real-time adaptive digital pulse signal processing for high count rate gamma-ray spectroscopy applications includes receiving a preamplifier signal at a pulse deconvolver, the preamplifier signal including resolution deterioration resulting from pulse pile-up. The method further includes generating a deconvoluted signal, by the pulse deconvolver, from the preamplifier signal, the deconvoluted signal having less resolution deterioration as compared to the received preamplifier signal. The method furthermore includes shaping of the deconvoluted signal by a trapezoid filter, the shaping comprising adjusting a shaping parameter of the trapezoid filter for an incoming signal based on a time separation from a subsequent incoming signal.

20 Claims, 12 Drawing Sheets

Table 1

| Parameters | Analog processing (at ICR = 100 kcps) | Fixed digital processing (at ICR = 1000 kcps) | Deconvolution and adaptive digital processing (at ICR = 1000 kcps) |
|---|---|---|---|
| Energy resolution<br>Throughput rate | 2.7 keV<br>35 kcps<br>(max. 50 kcps) | 4.25 keV<br>93 kcps<br>(max. 126 kcps) | 3.3 keV<br>370 kcps |

FIG. 8

HOLISTIC DIGITAL GAMMA-RAY SPECTROSCOPY METHODS AND INSTRUMENTATION FOR HIGH-THROUGHPUT HIGH-RESOLUTION APPLICATIONS

CROSS-REFERENCE TO RELATED APPLICATION

This application claims the benefit of U.S. Provisional Patent Application No. 62/821,658, filed on Mar. 21, 2019, the entire content of which is incorporated herein by reference.

STATEMENT OF FEDERALLY FUNDED RESEARCH

The present invention was made with United States Government support under Grant No. DE-NE0008444 awarded by the U.S. Department of Energy. The United States Government has certain rights in the invention.

TECHNICAL FIELD

The present invention relates generally to the field of nuclear engineering technology, and particularly, to a system and device for digital pulse signal processing for gamma-ray spectroscopy applications in nuclear engineering.

BACKGROUND

Applications in spent nuclear fuel assay, nuclear safeguards and advanced reactors (e.g., pebble bed reactors) require high-resolution, high-throughput gamma spectroscopy for the accurate estimation of quantities such as fuel isotopics and burn-up. The nuclear fuel in a fuel assembly or in an advanced nuclear reactor is an extremely high activity radioactive radiation source emitting a wide range of gamma ray energies. Advanced instrumentation is required for handling such high-count rates while preserving high spectroscopic performance.

The objective of pulse processing techniques in the field of nuclear engineering is to achieve an optimum signal to noise ratio, permitting operation at high count rates with high throughput and minimal degradation of energy resolution. At such high count rate conditions, the effects of the pile-up and the resulting baseline shift are severe. Under such conditions, the use of a shorter shaping filter may support high throughput but at the expense of deteriorating the energy resolution, whereas using a longer shaping filter supports good energy resolution but with low throughput.

Opportunities exist for improved pulse processing techniques for processing high count rate gamma-ray spectroscopy signals.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In accordance with the purposes of the disclosed devices and methods, as embodied and broadly described herein, the disclosed subject matter relates to devices and methods of use thereof. Additional advantages of the disclosed devices and methods will be set forth in part in the description, which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

Implementations may include one or more of the following features. According to one embodiment, a method of real-time adaptive digital pulse signal processing for high count rate gamma-ray spectroscopy applications comprises receiving a preamplifier signal at a pulse deconvolver, the preamplifier signal including resolution deterioration resulting from pulse pile-up. The method further comprises generating a deconvoluted signal, by the pulse deconvolver, from the preamplifier signal, the deconvoluted signal having less resolution deterioration as compared to the received preamplifier signal. The method further more comprises shaping of the deconvoluted signal by a trapezoid filter, the shaping comprising adjusting a shaping parameter of the trapezoid filter for an incoming signal based on a time separation from a subsequent incoming signal.

In various embodiments, the method further comprises processing the preamplifier signals at a rate of approximately $10^6$ counts/second.

In various embodiments, the method further comprises using a reconfigurable field programmable gate array (FPGA) for implementing one or more of the receiving, the generating, and the shaping.

In various embodiments, the method further comprises receiving the preamplifier signal from a high purity germanium (HPGe) detector.

In various embodiments, the preamplifier signal comprises a low-amplitude, short-duration current pulse received from a high purity germanium (HPGe) detector.

In various embodiments, the method further comprises converting a current pulse associated with the preamplifier signal to a voltage pulse by a resistive feedback (RC) preamplifier or a transistor reset preamplifier (TRP).

In various embodiments, the resistive feedback (RC) preamplifier or the transistor reset preamplifier (TRP) forms part of the high purity Germanium (HPGe) detector.

In various embodiments, the method further comprises processing the deconvoluted signal by one or more of a timing filter, a baseline restorer, and a pile-up rejecter.

In various embodiments, the pulse deconvolver comprises a linear time-invariant system.

In various embodiments, the receiving, the generating, and the shaping occur in real-time.

In various embodiments, the method further comprises reconstructing an original detector signal from the preamplifier signal.

In various embodiments, generating the deconvoluted signal comprises reducing a baseline shift associated with the received preamplifier signal.

In various embodiments, the method further comprises restoring noise in the received preamplifier signal with a Savitzy-Golay (S-G) filter.

In various embodiments, the method further comprises eliminating a pulse undershoot in the received preamplifier signal with a digital pole-zero cancellation algorithm.

In various embodiments, the method further comprises shortening a long decay in the received preamplifier signal with a digital pole-zero cancellation algorithm.

In various embodiments, the method further comprises determining a height of the deconvoluted signal with an optimum signal to noise ratio prior to the shaping.

In various embodiments, the pulse deconvolver comprises an algorithm.

In various embodiments, the method further comprises using algorithms for performing one or more of digital pole-zero cancellation, Savitzy-Golay (S-G) filtering, and exponential signal generation.

In various embodiments, the trapezoid filter comprises a digital trapezoid pulse-shaping algorithm.

In various embodiments, the method further comprises selecting a rise time of the trapezoid shaping filter for the deconvoluted signal in real-time, by the digital trapezoid pulse-shaping algorithm, based on pulse-to-pulse timing, and adjusting a flattop of the trapezoid filter for the deconvoluted signal, by the digital trapezoid pulse-shaping algorithm, to eliminate a ballistic deficit.

BRIEF DESCRIPTION OF THE DRAWINGS

FIG. 8 illustrates a tabulation of energy resolution and throughput performance summary with a $^{137}$Cs source, according to one or more embodiments of the presently disclosed subject matter.

DETAILED DESCRIPTION

Figure 1:
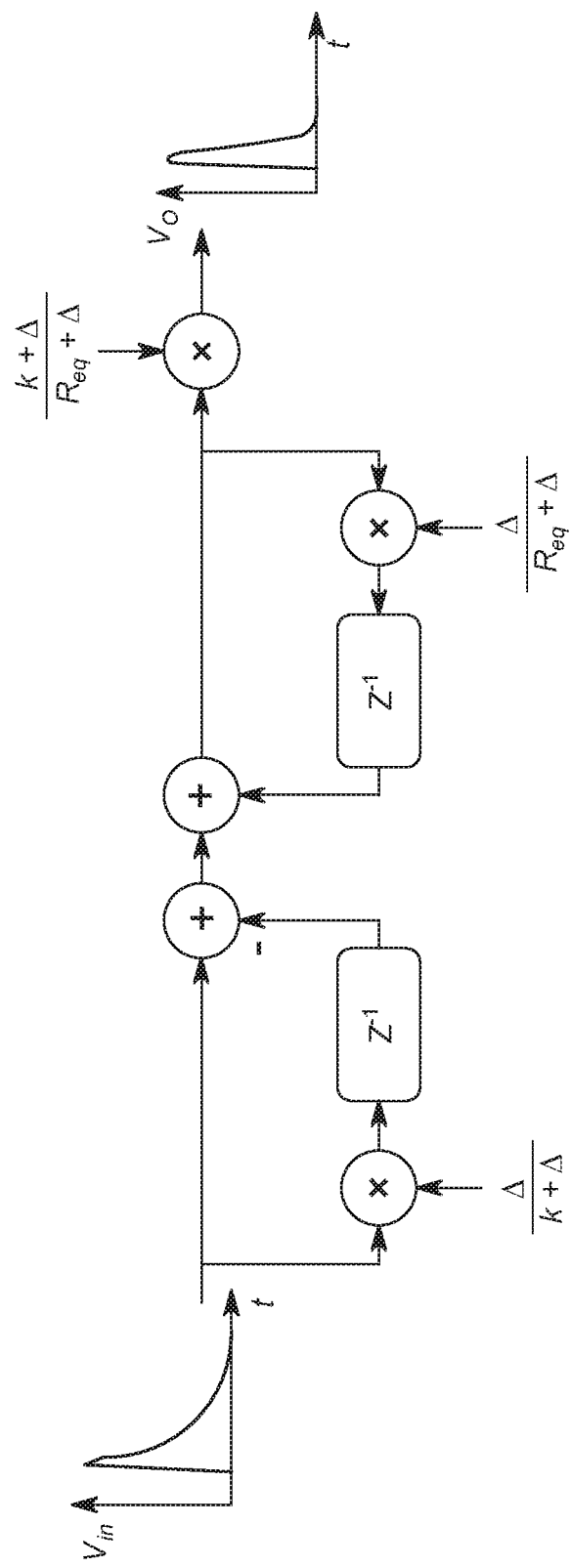
FIG. 1 is a block diagram of a digital implementation of pole-zero cancellation for RC preamplifier pulses, according to one or more embodiments of the presently disclosed subject matter.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are embodiments corresponding to high-resolution high-throughput real-time adaptive digital pulse processing system, method and device for use in high count rate gamma-ray spectroscopy applications. According to at least one embodiment, a method of real-time adaptive digital pulse signal processing for high count rate gamma-ray spectroscopy applications comprises receiving a preamplifier signal at a pulse deconvolver, the preamplifier signal including resolution deterioration resulting from pulse pile-up. The method further includes generating a deconvoluted signal, by the pulse deconvolver, from the preamplifier signal, wherein the deconvoluted signal has less resolution deterioration as compared to the received preamplifier signal. The method furthermore includes shaping of the deconvoluted signal by a trapezoid filter, wherein a shaping parameter of the trapezoid filter is adjusted for each incoming signal based on a time separation from a subsequent signal.

As is well-known to persons of skill in the relevant art, Convolution operation defines how the input signal is related to the output signal. Deconvolution is an algorithm-based process used to reverse the effects of convolution on recorded data. The concept of deconvolution is widely used in the techniques of signal processing and image processing. Because these techniques are in turn widely used in many scientific and engineering disciplines, deconvolution finds many applications.

A filter with a trapezoidal weighting function is the optimum one when both noise and variations in the charge collection time are present. A trapezoidal filter is realized by a time-variant (gated filter) system. Trapezoidal shaping can be accomplished using recursive algorithm. A PGA (programmable gate array) is an array of programmable logic cells interconnected by a network of wires and configurable switches. A FPGA (field programmable gate array) has a large number of these cells available to form multipliers, adders, accumulators and so forth in complex digital circuits. FPGAs can be infinitely reprogrammed in-circuit in only a small fraction of a second. New FPGA devices provide integrated memory component, to be used as histogram memory. Digital filters can be realized in FPGA with minimum resources using recursive algorithm. In a recursive algorithm, to synthesis a trapezoidal output y[n] from a step input x[n], we can process the input in two steps. In the first step, the step input x[n] is first converted to a bipolar rectangular pulse r[n]. In the second step, r[n] is converted to a trapezoidal output using an accumulator.

A finite impulse response (FIR) filter is a filter whose impulse response (or response to any finite length input) is of finite duration, because it settles to zero in finite time. This is in contrast to infinite impulse response (IIR) filters, which may have internal feedback and may continue to respond indefinitely. For FIR digital filters, the input-output relation involves a finite sum of products.

Recent developments in digital signal processing and field programmable gate arrays (FPGAs) have been advantageously applied by the inventors to achieve improved signal to noise ratio, high throughput, reliability and flexibility as compared to traditional analog and digital systems. Using FPGAs, the system can operate in real time and can allow consideration of the attributes of the generated signal on a pulse-by-pulse basis to enhance the throughput performance. Embodiments of the presently disclosed subject matter advantageously implement adaptive digital pulse processing algorithms on a reconfigurable field programmable gate array (FPGA). Embodiments of the presently disclosed subject matter can include various components such as a pulse deconvolver, an adaptive shaping filter, a timing filter, a baseline restorer, and a pile-up rejecter. In various embodiments, digital pulse deconvolution is implemented to reconstruct the original detector signal from the preamplifier signal; this results in reduction in resolution deterioration caused by pulse pile-up. The deconvoluted signal is further shaped with a trapezoid filter, with the shaping parameter being selected adaptively based on the time separation between successive input pulses.

Experimental testing was performed by the inventors using a high purity Germanium (HPGe) detector with a resistive feedback (RC) preamplifier and a transistor reset preamplifier (TRP), under varying input count rate and pulse shaping conditions, using a high activity $^{137}$Cs source. In experiments conducted based on methods as disclosed herein, measurements taken with a $^{137}$Cs source under varying count-rate conditions using germanium detectors equipped with resistive feedback and transistor reset preamplifiers (TRP) demonstrate that when using a TRP, adaptive digital signal processing can advantageously allow the handling of incoming signals at the rate of approximately $10^6$ counts/second in an efficient and effective manner. In addition, the implementation of a deconvolution approach limits resolution deterioration for throughput rates that are 4 to 10 times better than achievable in typical digital and analog gamma-ray spectroscopy systems. In one embodiment, methods as described herein are configured for processing preamplifier signals at the rate of at least 400 kcps (kilo counts per second).

The output signal received from a typical HPGe detector is a low-amplitude, short-duration current pulse. According to at least one embodiment, a preamplifier is employed to convert this charge (or current) pulse into a voltage pulse to be processed by the amplifier. A RC feedback preamplifier produces an exponential voltage pulse (e.g., with a decay time constant $\tau$F of ~50 μs) as the charge decays to the feedback circuit. The output of a transistor reset preamplifier (TRP) steps in a random staircase fashion. The preamplifier output is a convolution of the detector charge distribution function and the preamplifier response function. The preamplifier output signal can be given by:

$$v(t)=\int_{-\infty}^{\infty} g(t')h(t-t')dt'. \tag{1}$$

In Equation (1), v(t) represents the preamplifier output signal, g(t) represents the detector current signal, and h(t) represents the preamplifier's impulse response. In one embodiment, pole-zero cancellation is used to eliminate the pulse undershoot and to shorten the long decay of preamplifier pulses in the case of RC preamplifier. The digital pole-zero cancellation is developed and implemented digitally, and the block diagram of the algorithm is shown in FIG. 1, which illustrates a digital implementation of pole-zero cancellation for RC preamplifier pulses.

The transfer function of the digital pole-zero cancellation network in the z domain can be given as:

$$H_{PZ}(z) = \frac{k+\Delta}{R_{eq}+\Delta} \times \left[ \frac{1 - \frac{\Delta}{k+\Delta}z^{-1}}{1 - \frac{\Delta}{R_{eq}+\Delta}z^{-1}} \right], \quad (2)$$

In Equation (2), $\Delta = \tau_F/T_s$ where $\tau_F$ represents the decay time constant of the preamplifier pulse, and $T_s$ represents the sampling period. The terms k and $R_{eq}$ represent constants.

In various embodiments of the presently disclosed subject matter, deconvolution techniques are used to obtain the impulse response of the detector. In one embodiment, the deconvolution process recovers the detector signal from the convolution of the detector current signal with the impulse response of preamplifier, which is difficult to realize using analog pulse processing. In matrix form, Equation (1) can be represented as:

$$V_i = \sum_i H_{ij} G_j \text{ or } V = HG. \quad (3)$$

The original impulse can be reconstructed by matrix inversion as G=WV. The inverted matrix, known as a weight matrix W is a lower triangular matrix and the weights $w_1$, $w_2$, $w_3$ ... are required to recover the original signal g(t) from a measured signal v(t). The deconvoluted signal can be obtained as:

$$G(z) = V(z)[1 - z^{-1} e^{-x}] \quad (4)$$

In Equation (4), $x = T_s/\tau_{FP}$ wherein $\tau_{FP}$ represents the decay time constant after pole-zero cancellation. For the transistor reset preamplifier, the preamplifier pulses are staircase pulses. The impulse response of the reset type charge sensitive preamplifier is typically a unit step pulse. The deconvolution of these pulses can be performed using simple digital differentiation. However, the direct digitization of TRP pulses requires the digitizer to have an analog input voltage range of at least 4 $V_{pk-pk}$ (e.g., a voltage range of 2101 TRP) and high bit-resolution to minimize the quantization error. According to several embodiments of the instant invention, the TRP pulses are converted to exponential pulses using an analog differentiator. Pulse de-convolution is performed digitally using Equation (4). It is to be noted that pole-zero cancellation may not be required for the transistor reset preamplifier pulses.

Figure 2:
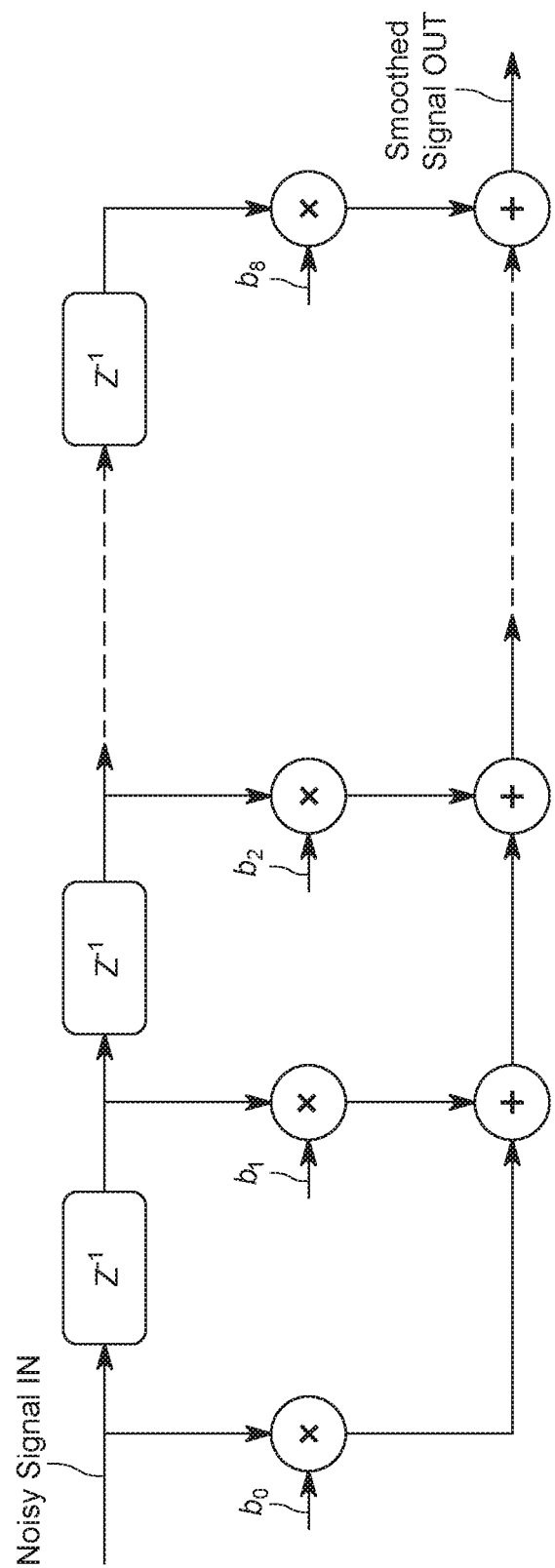
FIG. 2 is a block diagram of a digital implementation of a Savitzy-Golay filter as a finite infinite response (FIR) filter with pre-calculated coefficients, according to one or more embodiments of the presently disclosed subject matter.

The deconvolution operation also restores the noise. In various embodiments of the present invention, the deconvoluted signal is filtered with a Savitzy-Golay (S-G) filter that is a low pass filter based on a local least-squares polynomial approximation that can be applied to increase the SNR (single number rating) without distorting the signal. In the case of smoothing of the deconvoluted signal, the optimized frame size is chosen as 9, with a polynomial order 1. For an FPGA based implementation, the coefficients of S-G filtering are pre-calculated and then the SG filter is implemented as a standard finite infinite response (FIR) filter. In one embodiment, the objective is to achieve the pre-processing of signals accurately to enhance the signal to noise ratio in very short time for the real-time signal processing. The block diagram of the digital implementation of Savitzy-Golay filter as an FIR filter is shown in FIG. 2. FIG. 2 is a block diagram of a digital implementation of a Savitzy-Golay filter as a finite infinite response (FIR) filter with pre-calculated coefficients.

In some embodiments, pulse shaping of the deconvoluted signal is required to determine the height of the signal with an optimum signal to noise ratio. Before the implementation of the shaping filter, the exponential signal is synthesized to define a linear time invariant recursive system in response to an input signal and it can be synthesized as follows:

$$Y(z) = G(z) + a z^{-1} Y(z) \quad (5)$$

In Equation (5), a represents the exponential base and G (z) represents the deconvoluted signal, as an input to generate the exponential pulse.

According to several embodiments, the generated exponential signal has a rise time constant $\tau_R$ which is the charge collection time of original signal and decay time constant $\tau_{F1} \sim 0.1$ µs. Radioactive decay is a random process. The radiation pulses follow an interval distribution based on the random nature and the distribution of intervals between successive pulses depending on the rate of occurrence. The interval distribution can be used to adapt the shaping parameter of the shaping filter on a pulse-by-pulse basis.

As mentioned earlier, in at least one embodiment, a digital trapezoid pulse-shaping algorithm is employed as the shaping filter. Trapezoid shaping in the case of semiconductor detectors provide several potential advantages. The exponential pulses generated after pulse deconvolution have the same order of rise-time ($\tau_R$) and decay-time constant ($\tau_{F1}$). Thus, the conventional trapezoid shaping algorithm can be advantageously modified in order to incorporate the rise time and decay time constant.

Figure 3A:
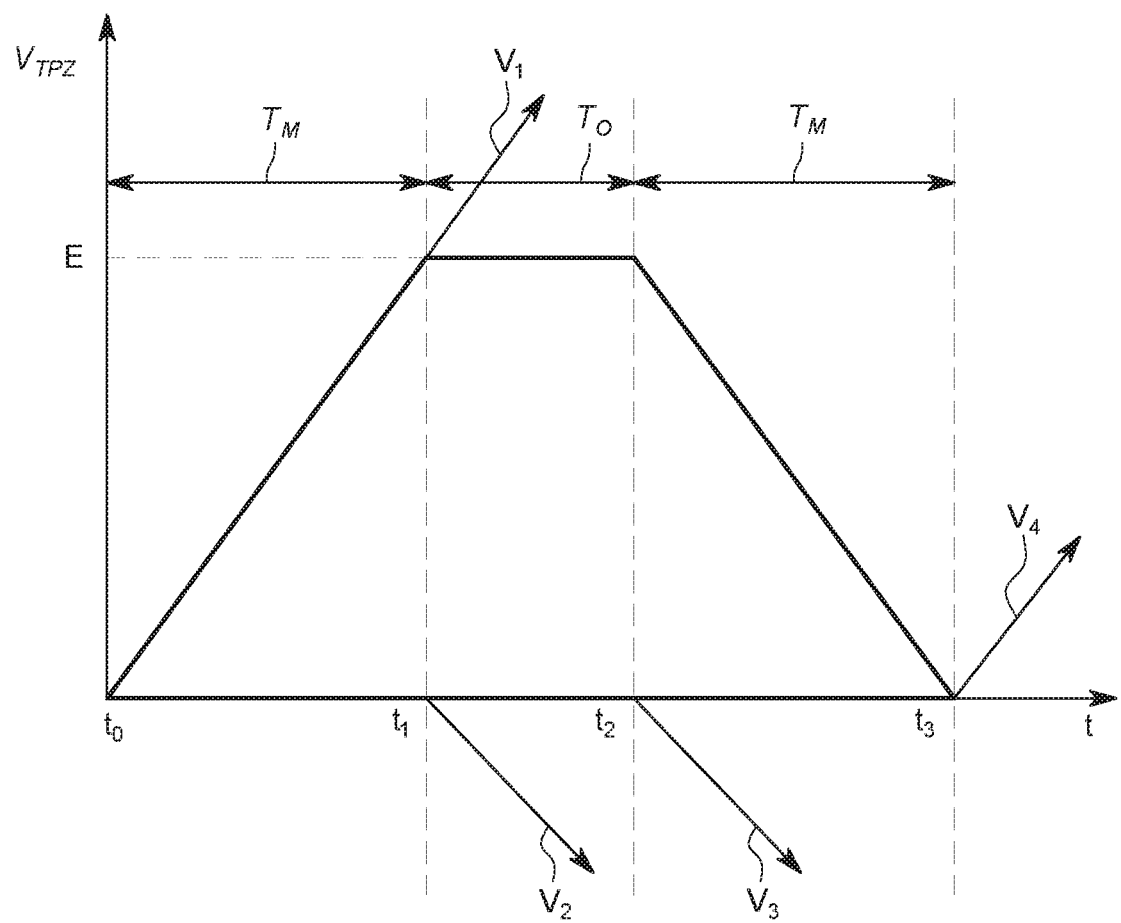
FIG. 3A is a graphical illustration of a synthesis of the trapezoid shaped pulse, according to one or more embodiments of the presently disclosed subject matter.
Figure 3B:
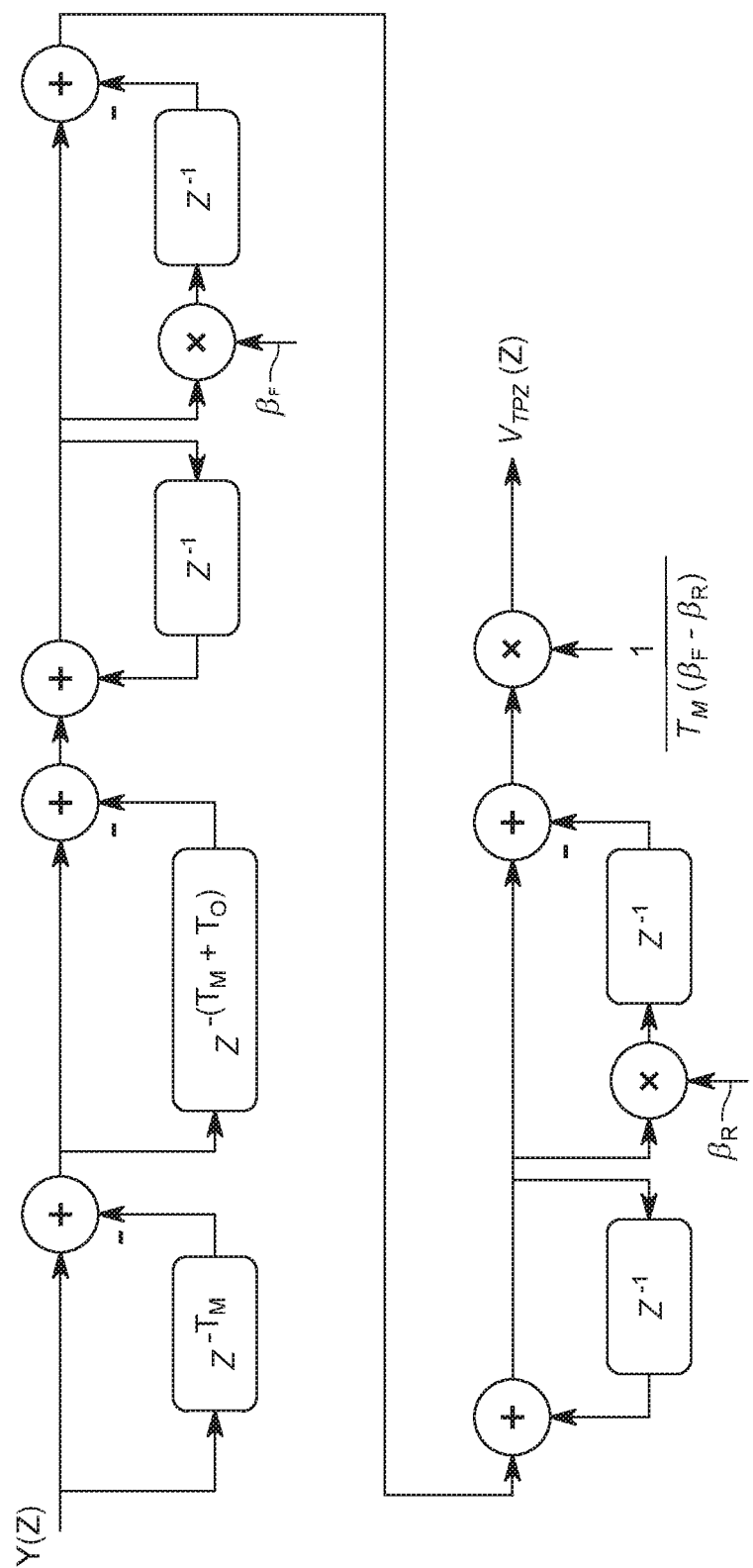
FIG. 3B is a schematic illustration of a block diagram of a digital trapezoid-shaping algorithm, according to one or more embodiments of the presently disclosed subject matter.
Figure 4A:
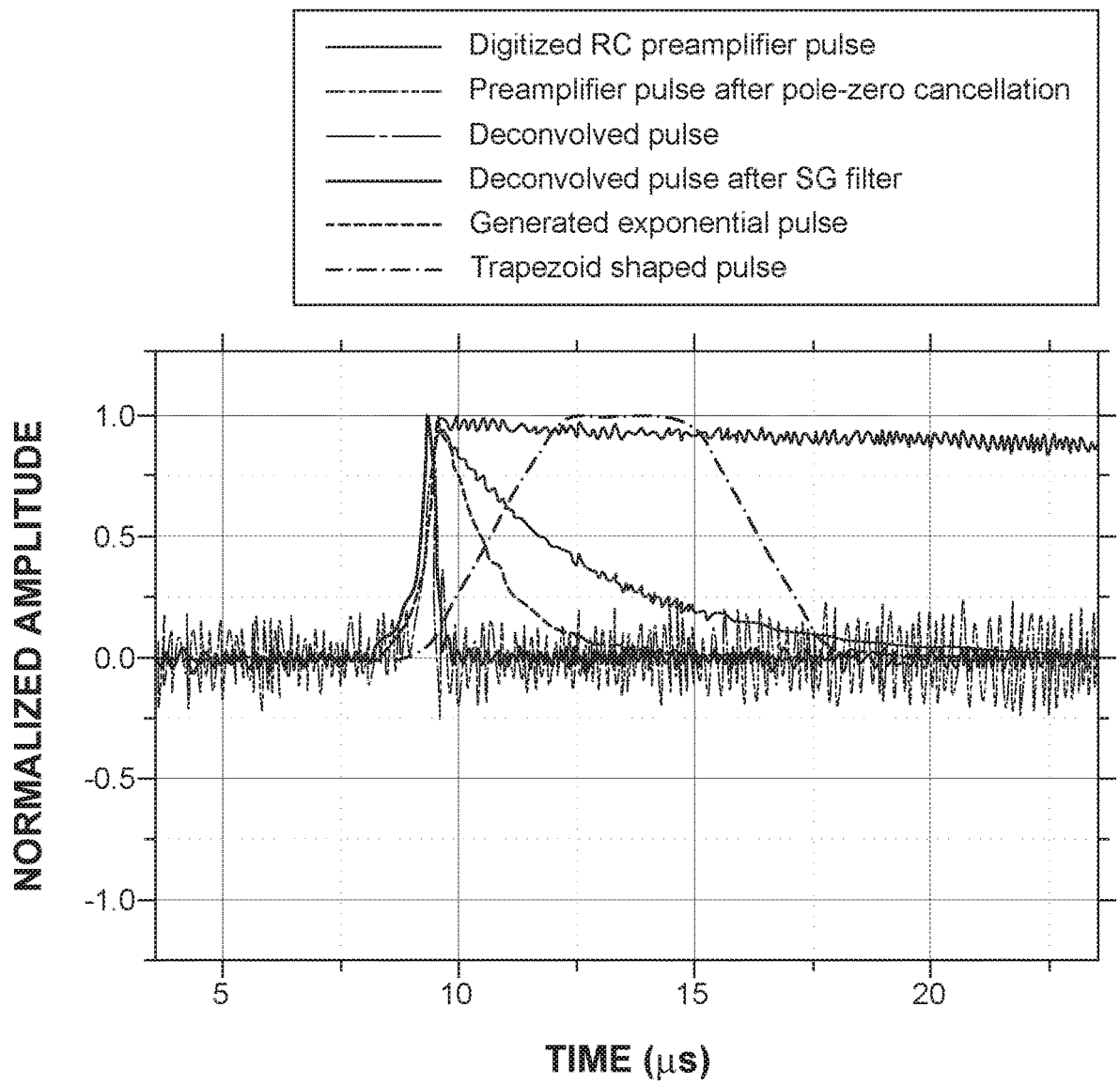
FIG. 4A is a graphical illustration of simulation results of the MATLAB implementation of the digital pole-zero cancellation, digital pulse deconvolution, Savitzy-Golay low pass filter, exponential pulse generation and trapezoid shaping with RC preamplifier pulse, according to one or more embodiments of the presently disclosed subject matter.
Figure 4B:
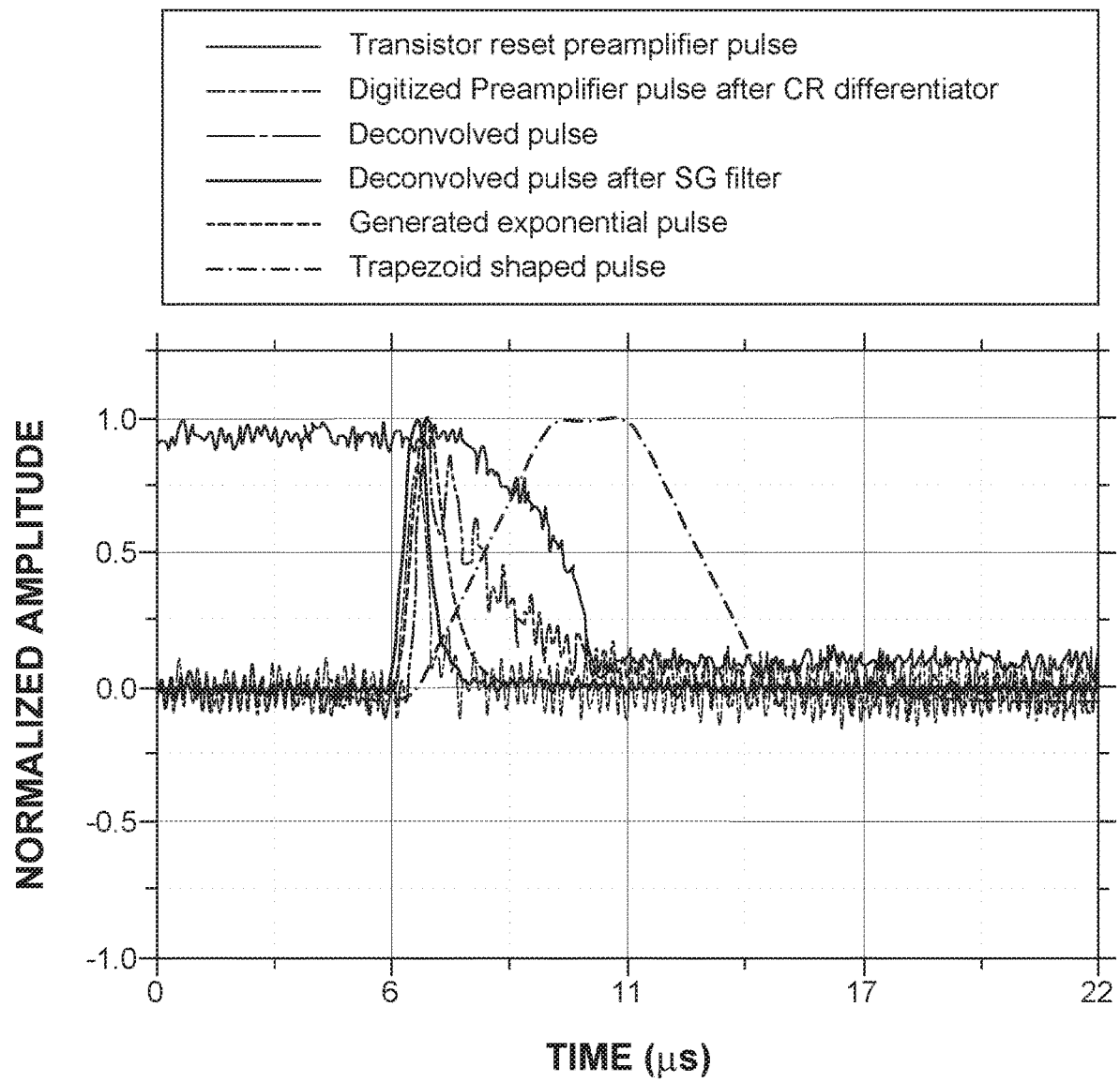
FIG. 4B is a graphical illustration of simulation results of the MATLAB implementation of the digital pole-zero cancellation, digital pulse deconvolution, Savitzy-Golay low pass filter, exponential pulse generation and trapezoid shaping with transistor-reset preamplifier pulse, according to one or more embodiments of the presently disclosed subject matter.

In some embodiments, the digital trapezoid filter is implemented with a rise time of $T_M$ and with a flattop time of $T_o$ as shown in FIG. 3A. FIG. 3A is a graphical illustration of synthesis of the trapezoid shaped pulse. The rise time is set to be adaptive according to the time interval of separation between incoming preamplifier pulses. Based on the separation between the input pulses, the adaptive shaping algorithm selects the rise time of the trapezoid shaping filter for each incoming signal. The flattop of the trapezoid filter can be adjusted to eliminate the ballistic deficit. The block diagram of digital trapezoid shaping is shown in FIG. 3B, where $\beta_F = \exp(-T_s/\tau_{F1})$, $\beta_R = \exp(-T_s/\tau_R)$, and $T_s$ is the sampling time. FIG. 3B is a schematic illustration of a block diagram of a digital trapezoid-shaping algorithm. The algorithms including digital pole-zero cancellation, digital pulse deconvolution, SG filter, exponential signal generation and trapezoid shaping can be simulated with MATLAB and results for a RC preamplifier and a transistor reset preamplifier pulse are shown in FIGS. 4A and 4B, respectively. FIG. 4A is a graphical illustration of simulation results of the MATLAB implementation of the digital pole-zero cancellation, digital pulse deconvolution, Savitzy-Golay low pass filter, exponential pulse generation and trapezoid shaping with RC preamplifier pulse; and, FIG. 4B is a graphical illustration of simulation results of the MATLAB implementation of the digital pole-zero cancellation, digital pulse deconvolution, Savitzy-Golay low pass filter, exponential pulse generation and trapezoid shaping with transistor-reset preamplifier pulse.

Figure 5:
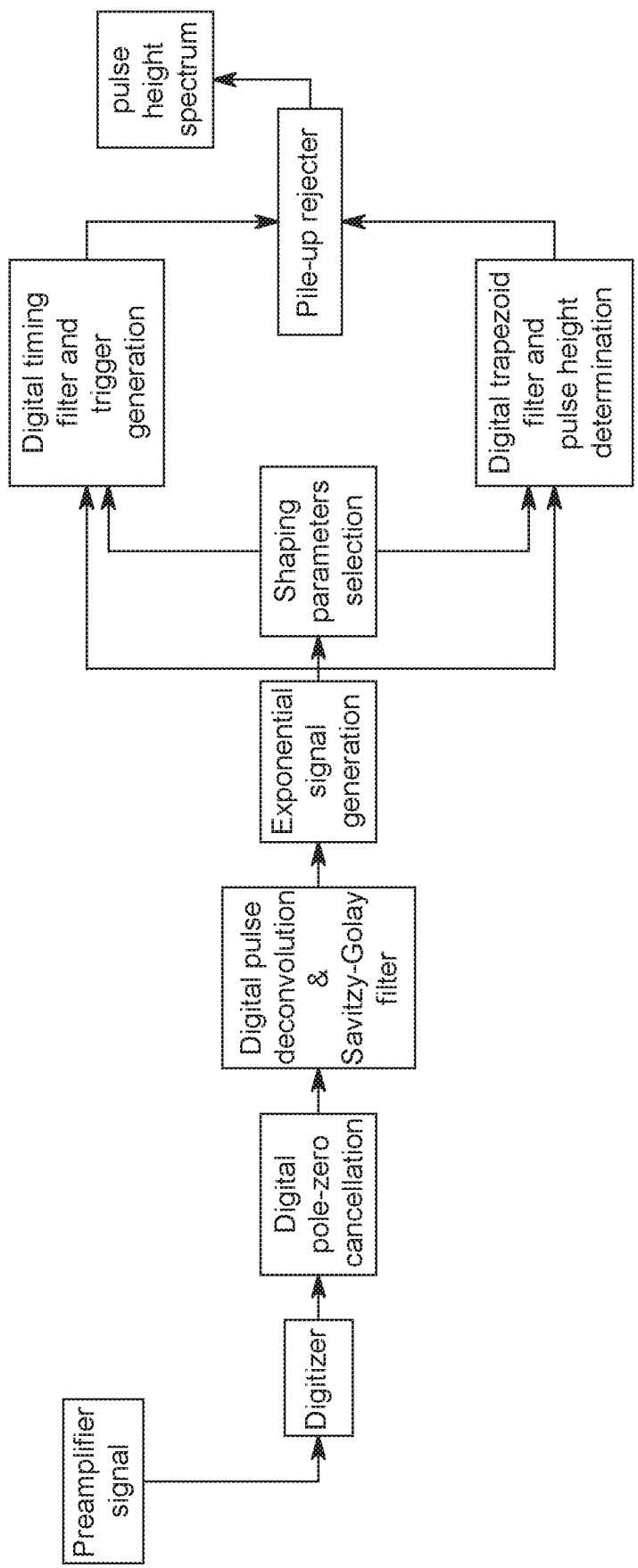
FIG. 5 is a block diagram representing the digital pulse deconvolution and adaptive digital shaping pulse processing chain, according to one or more embodiments of the presently disclosed subject matter.

In at least one embodiment, a digital RC-$CR^2$ filter is used as a timing filter for the generation of various triggers. The height of the trapezoid is determined at the center of the flattop time. For the determination of actual trapezoid height, accurate baseline estimation is required. Baseline determination is realized by digital averaging of the trapezoid baseline with the gated restoration scheme, and then the baseline is subtracted from the trapezoid flattop height for the determination of actual trapezoid height. The digital rising and trailing edge pile-up rejection algorithm is implemented to reject the piled up pulses. The block diagram of the developed digital pulse processing process is shown in FIG. 5, which represents the digital pulse deconvolution and adaptive digital shaping pulse processing chain. The digital pole-zero cancellation is required in the case of the RC preamplifier.

Figure 6:
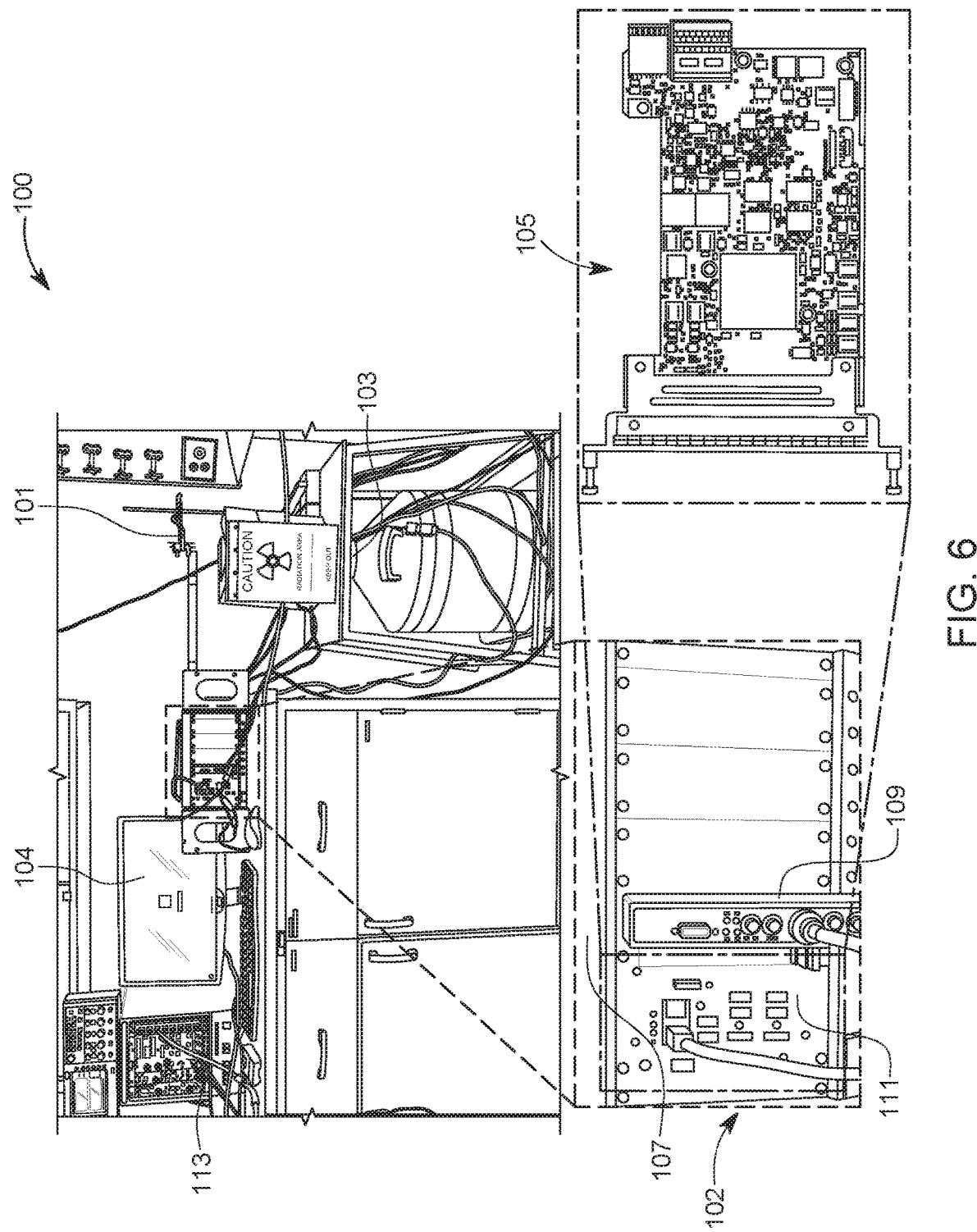
FIG. 6 is an illustration of an experimental setup consisting of a germanium HPGe detector and it associated electronics, a digitizer, and a field programmable gate array (FPGA) for digital pulse processing and a controller unit such as a host computer, according to one or more embodiments of the presently disclosed subject matter.

An experimental setup 100 is shown in FIG. 6. According to an example system configuration, in at least one embodiment as illustrated in FIG. 6, a $^{137}$Cs gamma source 101 is used for evaluating the performance of the developed system. The source position is varied to obtain different count rates. The measurements are carried out using two coaxial p-type HPGe detectors 103 with the relative efficiency of 25% at 1333 keV. The first detector (Detector 1 or Det. 1) consists of a RC feedback preamplifier and the second detector (Detector 2 or Det. 2) is employed with a transistor reset preamplifier. The TRP pulses are processed using a CR shaper to shape the detector output to an exponential pulse. The inhibit output of the TRP is set to be at the minimum value ~2.4 µs to reduce the dead-time losses caused by the reset process. The inhibit signal is used to prevent the digital pulse processing during the reset time. The HPGe detector's preamplifier signal is digitized using a high-speed 14-bit digitizer with a sampling rate of 125 MS/s. The digitized preamplifier signals are fed to the reconfigurable field programmable gate array (FPG) such as FPGA 105. In one embodiment, FPGA 105 represents a FPGA sold under the trade name Xilinx Kintex 7. Various DSP algorithms including digital pole-zero cancellation (in the case of RC preamplifier), pulse-deconvolution, Savitzy-Golay filter, trapezoid shaping with adaptive shaping times, timing filter, baseline restorer and pile-up rejecter are implemented on the FPGA. The Xilinx Vivado 2013.4 compilation tool is used for the compilation. FIG. 6 is an illustration of an experimental setup consisting of a germanium HPGe detector and it associated electronics, a digitizer, and a field programmable gate array (FPGA) for digital pulse processing and a controller unit such as a host computer. As illustrated in FIG. 6, the experimental setup further includes detector electronics 113 and a digitizer 102. FPGA 105 can form part of digitizer 102. Digitizer 102 can further include a chassis 107, an adaptor module 109, and a controller 111. The controller unit (host computer 104) communicates with FPGA 105 using the first in first out blocks (FIFOs) to extract the energy (pulse-height) and counting rate (input count rate and throughput rate) information.

Figure 7A:
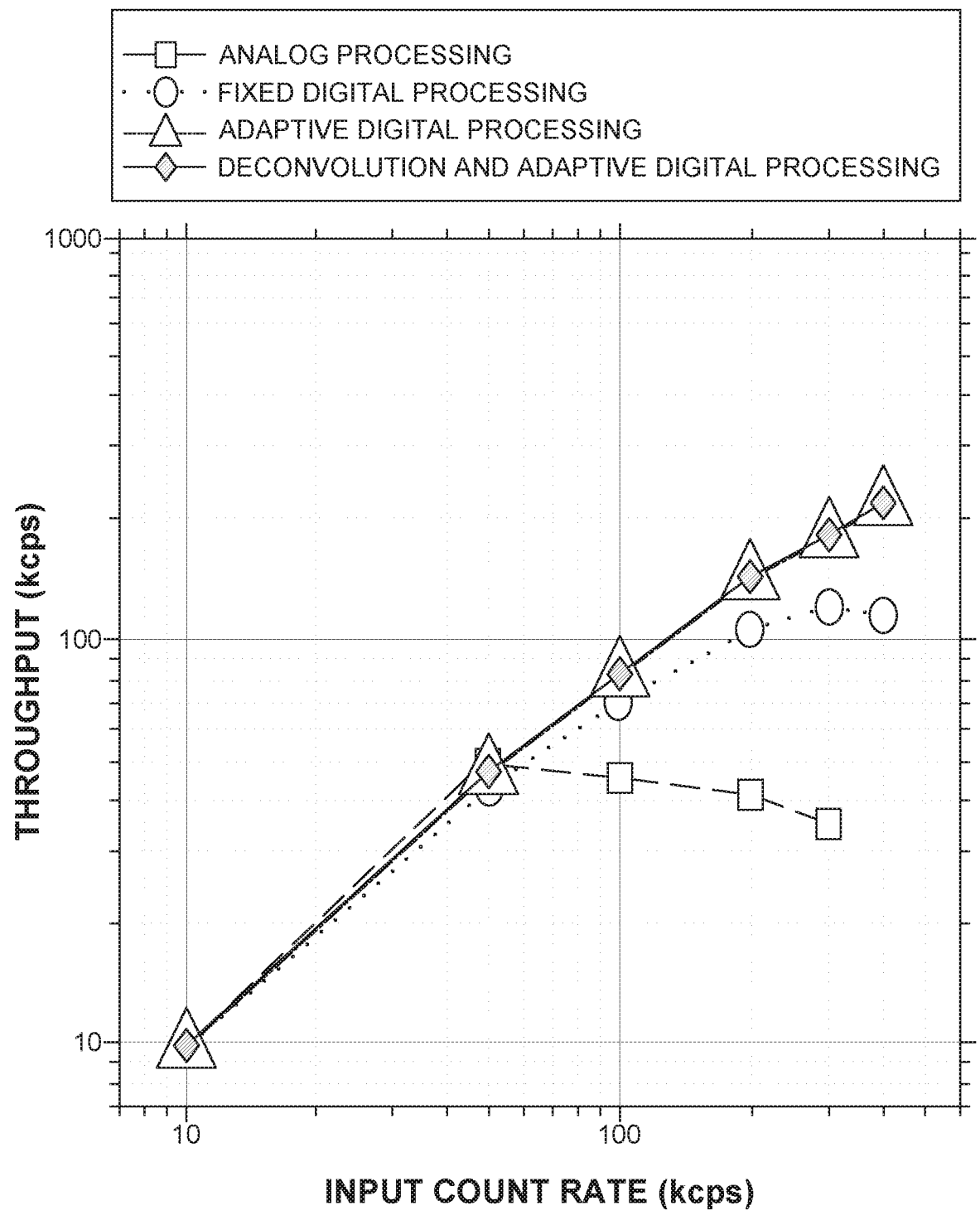
FIG. 7A is a graphical illustration of comparison of performance of input count rate versus throughput with Detector 1 using a RC preamplifier, according to one or more embodiments of the presently disclosed subject matter.
Figure 7B:
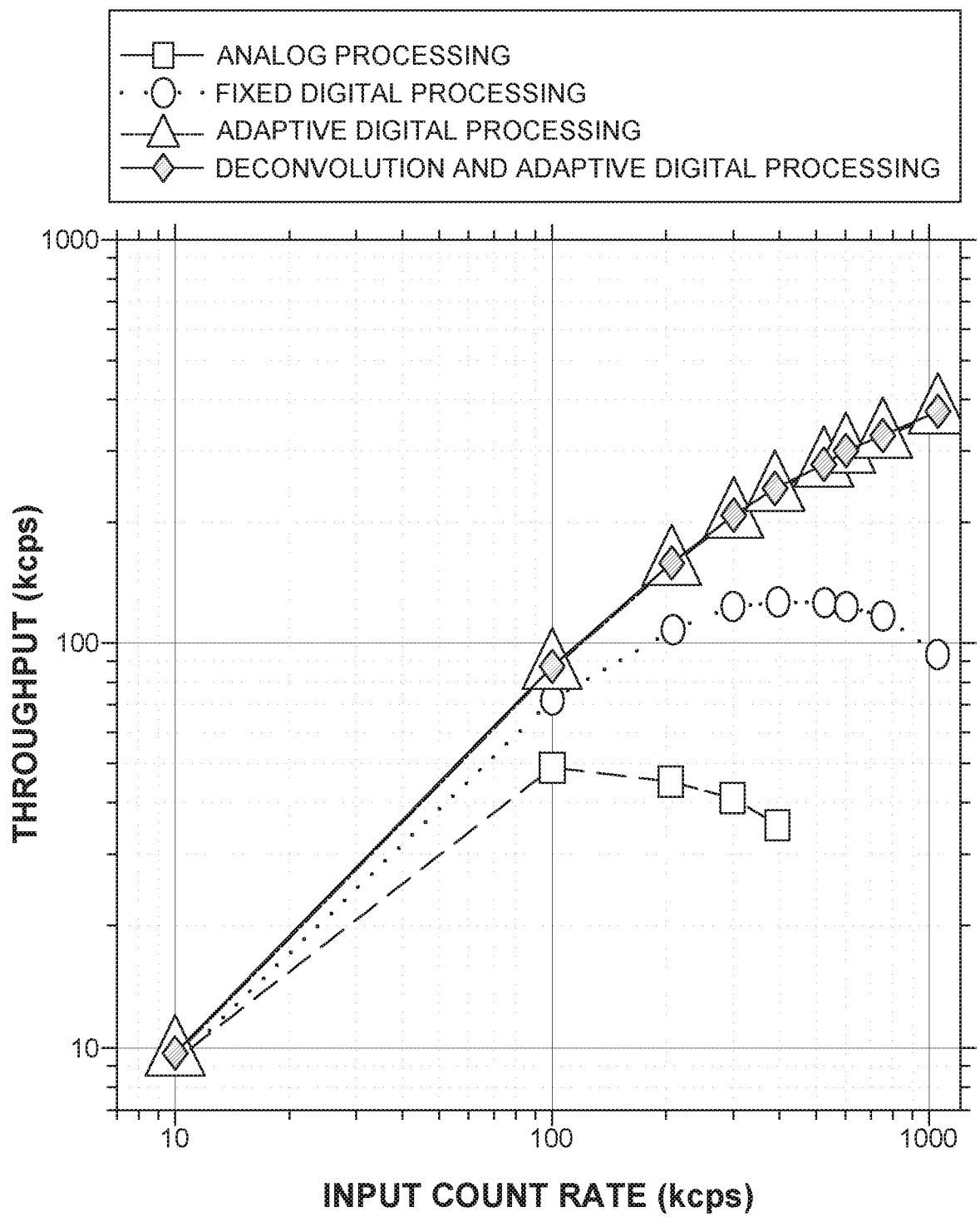
FIG. 7B is a graphical illustration of comparison of input count rate versus throughput with Detector 2 using transistor-reset preamplifier, according to one or more embodiments of the presently disclosed subject matter.
Figure 7C:
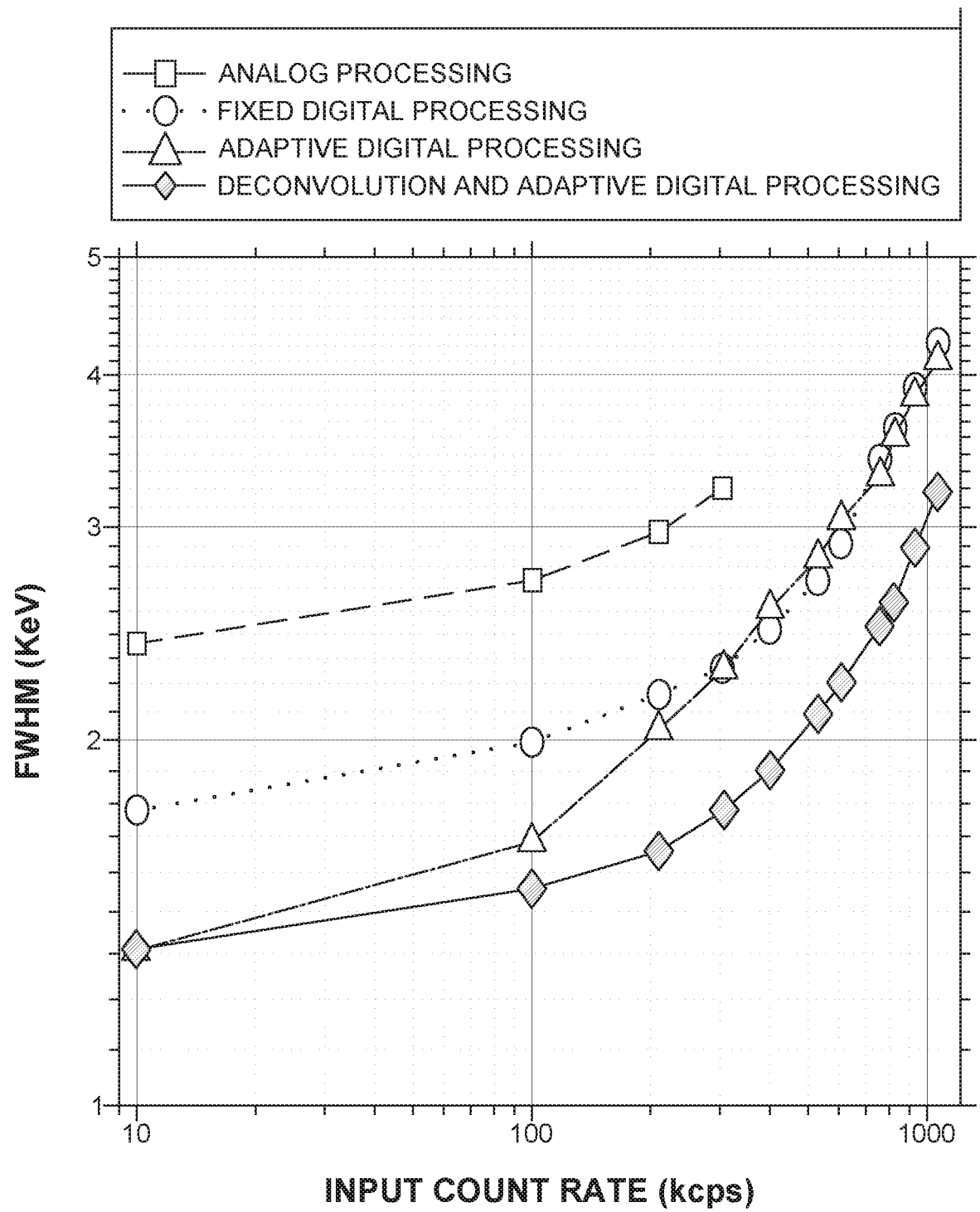
FIG. 7C is a graphical illustration of comparison of input count rate versus energy resolution performance at 662 keV $^{137}$Cs with Detector 2 using the transistor-reset preamplifier, according to one or more embodiments of the presently disclosed subject matter.

The results of the experiments are illustrated in FIG. 7, which illustrates the resolution and throughput performance with varying input count rates. FIG. 7A is a graphical illustration of comparison of performance of input count rate versus throughput with Det. 1 using RC preamplifier; FIG. 7B is a graphical illustration of comparison of input count rate versus throughput with Detector 2 using transistor-reset preamplifier; FIG. 7C is a graphical illustration of comparison of input count rate versus energy resolution performance at 662 keV $^{137}$Cs with Detector 2 using the transistor-reset preamplifier. It can be observed from FIG. 7A that with the HPGe Detector 1 (or Det. 1), which is equipped with a RC preamplifier, the maximum input count rate achievable is about 400 kcps (kilo counts per second). The RC preamplifiers are energy rate limited. The energy rate limit of the preamplifier is defined as the number of events per unit of time and the energy of those events and the unit of the energy rate limit is MeV/s. The energy rate limit is a function of the feedback resistor and dynamic range. In TRP, the feedback resistor is replaced with a reset circuit that monitors the dc level of the preamplifier and discharges the feedback capacitor whenever it starts to approach saturation. The elimination of the feedback resistor reduces the low-frequency noise, thus providing better energy resolution performance at high-count rates. A TRP is not energy rate limited like RC type preamplifier, so a TRP virtually never shuts down due to saturation. However, TRP reset period contributes to the system dead-time and it increases with the input count rate.

It was observed by the inventors that the digital pulse deconvolution with adaptive shaping improves the throughput performance as compare to fixed digital pulse processing and analog pulse processing. With the TRP preamplifier, the system is able to operate at 1 Mcps (million counts per second). In various embodiments, by using the pulse deconvolution technique, the original detector signal is recovered which reduces the baseline shifts at high count rates thereby reducing resolution degradation with an increase in input count rates—relative to adaptive shaping alone—while providing a similar throughput performance.

According to at least one embodiment, the rise time of the trapezoid shaping filter is selected adaptively for each preamplifier pulse based on the distance between the successive pulses and the flattop time; in one embodiment, the rise time of the trapezoid shaping filter was chosen as 0.7 µs to compensate the ballistic deficit. The throughput rate reported was 370 kcps with the energy resolution of 3.3 keV. The throughput was limited by the charge collection time of the coaxial type HPGe detector.

The throughput achieved by the developed system was found to be nearly 4 to 10 times as compared to traditional digital and analog pulse processing, in addition to 25% improvement in energy resolution relative to traditional digital shaping. The performance summary is given in Table 1 of FIG. 8, which tabulates energy resolution and throughput performance summary with a $^{137}$Cs source, according to one or more embodiments of the presently disclosed subject matter.

Accordingly, as described herein, a high-resolution high-throughput real-time adaptive digital pulse processing system including pulse deconvolution is provided for use with high count rate applications. Digital pulse processing algorithms can be implemented on a reconfigurable FPGA for real-time pulse processing. The digital pulse processing can include one or more of a trapezoid shaping filter, a timing filter, a baseline restorer and a pile-up rejecter. The pulse deconvolution technique as described herein can advantageously reconstruct the original detector signal from the preamplifier output signal, which can reduce the energy resolution degradation due to pulse pile-up. The deconvoluted signal is further shaped with a trapezoid filter with the shaping parameter being selected adaptively for each incoming signal based on the time separation between successive input pulses, thus minimizing throughput losses.

Embodiments of the presently disclosed subject matter accordingly provide for the development and implementation of an FPGA based high-resolution high-throughput real-time adaptive digital pulse processing system including pulse deconvolution. The deconvolver as described herein is a linear time-invariant system, which can be used to reconstruct the original detector signal from the preamplifier output signal, which in turn allows measurement of the true ballistic detector signal. With adaptive pulse shaping, it is possible to perform the real-time selection of the shaping parameters (rise time of the trapezoid shaping filter) for each incoming signal based on the time separation from a subsequent pulse. As explained in careful detail above, experimental testing of the pulse deconvolution technique with the adaptive approach as developed under various embodiments of the presently disclosed subject matter indicate that the embodiments of the present invention are capable of handling 1 million counts (1 Mcps) using an HPGe detector equipped with a transistor reset preamplifier as described herein.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of real-time adaptive digital pulse signal processing for high count rate gamma-ray spectroscopy applications, the method comprising:
   receiving a preamplifier signal at a pulse deconvolver, the preamplifier signal including resolution deterioration resulting from pulse pile-up;
   generating a deconvoluted signal, by the pulse deconvolver, from the preamplifier signal, the deconvoluted signal having less resolution deterioration as compared to the received preamplifier signal; and
   shaping of the deconvoluted signal by a trapezoid filter, the shaping comprising adjusting a shaping parameter of the trapezoid filter for an incoming signal based on a time separation from a subsequent incoming signal.

2. The method of claim 1, further comprising processing the preamplifier signals at a rate of approximately $10^6$ counts/second.

3. The method of claim 1, further comprising using a reconfigurable field programmable gate array (FPGA) for implementing one or more of the receiving, the generating, and the shaping.

4. The method of claim 1, further comprising receiving the preamplifier signal from a high purity germanium (HPGe) detector.

5. The method of claim 4, further comprising converting a current pulse associated with the preamplifier signal to a voltage pulse by a resistive feedback (RC) preamplifier or a transistor reset preamplifier (TRP).

6. The method of claim 5, wherein the resistive feedback (RC) preamplifier or the transistor reset preamplifier (TRP) forms part of the high purity Germanium (HPGe) detector.

7. The method of claim 1, wherein the preamplifier signal comprises a low-amplitude, short-duration current pulse received from a high purity germanium (HPGe) detector.

8. The method of claim 1, further comprising processing the deconvoluted signal by one or more of a timing filter, a baseline restorer, and a pile-up rejecter.

9. The method of claim 1, wherein the pulse deconvolver comprises a linear time-invariant system.

10. The method of claim 1, wherein the receiving, the generating, and the shaping occur in real-time.

11. The method of claim 1, further comprising reconstructing an original detector signal from the preamplifier signal.

12. The method of claim 1, wherein generating the deconvoluted signal comprises reducing a baseline shift associated with the received preamplifier signal.

13. The method of claim 1, further comprising restoring noise in the received preamplifier signal with a Savitzy-Golay (S-G) filter.

14. The method of claim 1, further comprising eliminating a pulse undershoot in the received preamplifier signal with a digital pole-zero cancellation algorithm.

15. The method of claim 1, further comprising shortening a long decay in the received preamplifier signal with a digital pole-zero cancellation algorithm.

16. The method of claim 1, further comprising determining a height of the deconvoluted signal with an optimum signal to noise ratio prior to the shaping.

17. The method of claim 1, wherein the pulse deconvolver comprises an algorithm.

18. The method of claim 1, further comprising applying algorithms for performing one or more of digital pole-zero cancellation, Savitzy-Golay (S-G) filtering, and exponential signal generation.

19. The method of claim 1, wherein the trapezoid filter comprises a digital trapezoid pulse-shaping algorithm.

20. The method of claim 19, further comprising:
   selecting a rise time of the trapezoid shaping filter for the deconvoluted signal in real-time, by the digital trapezoid pulse-shaping algorithm, based on pulse-to-pulse timing, and
   adjusting a flattop of the trapezoid filter for the deconvoluted signal, by the digital trapezoid pulse-shaping algorithm, to eliminate a ballistic deficit.

* * * * *